April 24, 1956  E. H. DEEMER ET AL  2,743,044
BABY FOOD DISPENSER
Filed July 6, 1953
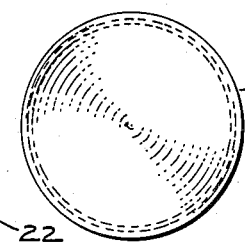
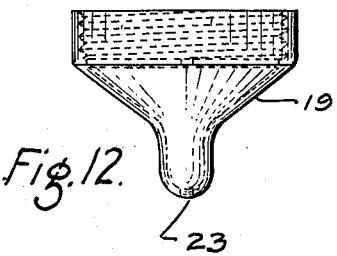
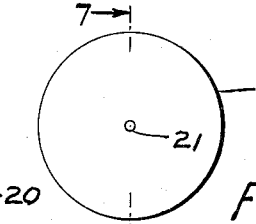
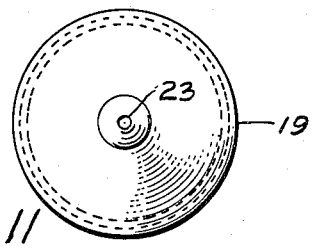
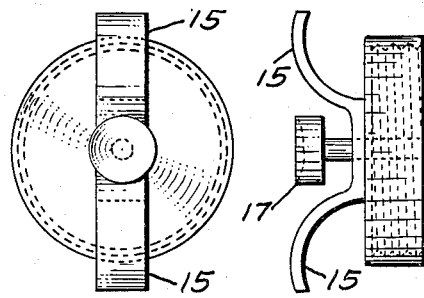
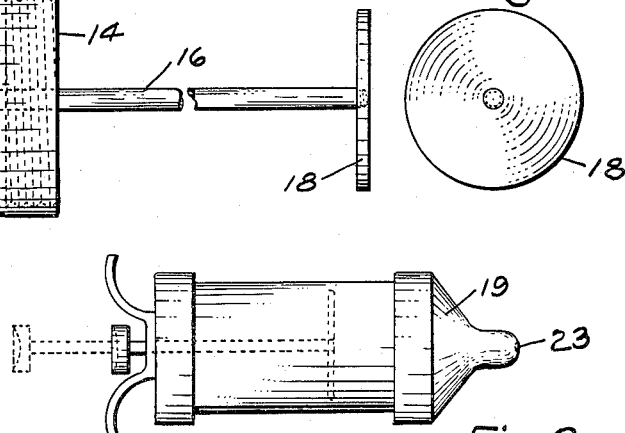
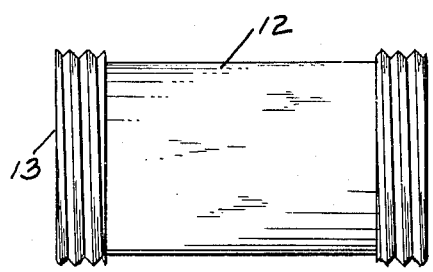
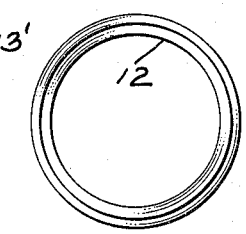
INVENTORS
EVELYN H. DEEMER and
BY HECTOR G. HOWARD
Edward C Healy
ATTORNEY

United States Patent Office 2,743,044
Patented Apr. 24, 1956

2,743,044
BABY FOOD DISPENSER

Evelyn H. Deemer and Hector G. Howard, Burlingame, Calif.

Application July 6, 1953, Serial No. 366,358

1 Claim. (Cl. 222—323)

This invention relates to improvements in feeding appliances and has particular reference to a unique baby food feeder.

The principal objects of the invention are the provision of a feeder of the character described that embodies in its construction a heat resistant tubular housing adapted to retain therein food or liquid to be fed to a baby, means for manually forcing the food products or the like through the container to a distinctive nipple and apertured disc arrangement whereby the volume of the feeding is readily controlled.

A further object of the invention is the provision of a construction that can be readily dismantled for cleansing purposes to thus make the feeder highly sanitary.

A further object of the invention is the production of an article of the character described that is simple in construction, economical to manufacture, positive in operation and highly efficient and serviceable in use.

Other objects and advantages will be apparent during the course of the following description.

In the accompanying drawing forming a part of this specification and in which like numerals are employed to designate like parts throughout the same, Fig. 1 is a side elevational view of the cylindrical body of the appliance, Fig. 2 is an end elevational view of the same, Fig. 3 is a side elevational view of the assembled structure, Fig. 4 is a top plan view of the upper cap plunger and finger holds, Fig. 5 is a side elevational view of the plunger and cap removed from the cylindrical member, Fig. 6 is an end view of the plunger disc, Fig. 7 is a transverse vertical sectional view of the apertured disc of the invention, the view being taken on the line 7—7 of Fig. 8, Fig. 8 is a side elevational view of the feeder disc, Fig. 9 is a side elevational view of a lower cap that is threadedly received on the lower end of the cylinder member, when the nipple of the invention is not in use, Fig. 10 is a top plan view of the lower cap, Fig. 11 is a top plan view of the nipple of the invention, and Fig. 12 is a side elevational view of the same.

In the accompanying drawing wherein for the purpose of illustration is shown a preferred embodiment of our invention, the numeral 12 indicates a cylindrical tubular member that is open at its opposite ends and is externally threaded as at 13 and 13'. This member is made of heat resistant glass and is adapted to retain therein the food to be fed to the baby. Adapted to be detachably secured to the threaded end 13 of said member 12 is an internally threaded upper cap 14 that has integrally formed therewith curved finger holds 15 that serve as a means for holding the feeder during the operation of the appliance. The cap and finger holds are preferably made of Bakelite. Adapted to pass through a central opening formed in the finger holds and a central portion of the cap is a metal plunger rod 16, that has mounted on its upper end an operating knob 17, and likewise mounted on its opposite end a plunger disc 18 that forces the material to be fed, towards the nipple end of the appliance as the plunger rod is pushed downward into the cylindrical member 12.

The nipple of the invention, that is preferably made of flexible plastic, is indicated by the numeral 19, and is provided with internal threads 20 adapted to threadedly engage the external threads 14 of the member 12. The collar portion of the nipple is adapted to receive therein and at the base thereof, a replaceable and detachable feeding disc 20 that is apertured as at 21. These openings may be of varying sizes, depending on the rapidity desired in the feeding operation and the nature of the products to be fed to the baby.

The lower cap 22, as illustrated to advantage in Figs. 9 and 10, serves to cover the lower end of the cylindrical member 12 and is threadedly secured thereon, when the nipple has been removed for cleaning the same. This cap 22 cooperates with the upper cap 14 to close the ends of the tubular body to retain excess food material in the appliance.

In practice, when the user wishes to fill the device with any desired food product or liquid, it is only necessary to remove the lower cap 22, and to slide the plunger and its disc to the dotted line position (see Fig. 3). The nipple 19 with the apertured feeding disc fitted therein is then threaded on the end 13 of the member 12. Actuation of the plunger toward the nipple will force the food through the apertured disc and thence through the restricted nipple opening 23 to the mouth of the baby to be fed.

From the foregoing description considered in connection with the accompanying drawing, it will be obvious that we have devised a distinctive and unique article of manufacture, whereby the objects of the invention can be readily carried out.

It is to be understood that the form of our invention herewith shown and described is to be taken as a preferred example of the same and that various changes relative to the shape, size, material and arrangement of parts may be readily resorted to without departing from the spirit of the invention or the scope of the subjoined claim.

Having thus described our invention, we claim:

A baby food feeder comprising a tubular housing adapted to retain therein a food product to be fed to a baby, said housing being externally threaded at its opposite ends, an apertured cap equipped with finger holds and threadedly secured to one end of said housing, an internally threaded and apertured nipple detachably secured to the external threads of the opposite end of said housing, an apertured disc threadedly secured in said nipple for controlling the volume of food passing to the apertured nipple, and means for forcing the food through the disc and to the nipple, said means comprising a central rod adapted to penetrate the apertured cap and being equipped at one end with an operating knob and at its opposite end with a plunger disc.

References Cited in the file of this patent
UNITED STATES PATENTS

| | | |
|---|---|---|
| 950,710 | Williams | Mar. 1, 1910 |
| 954,564 | Dunfee | Apr. 12, 1910 |
| 1,157,552 | Kispert | Oct. 19, 1915 |
| 2,303,997 | Hogg | Dec. 1, 1942 |